US010873925B2

(12) United States Patent
Zhao

(10) Patent No.: US 10,873,925 B2
(45) Date of Patent: Dec. 22, 2020

(54) TIME-FREQUENCY RESOURCE DETERMINING METHOD AND APPARATUS

(71) Applicant: HUAWEI TECHNOLOGIES CO., LTD., Shenzhen (CN)

(72) Inventor: Zhenshan Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/370,960

(22) Filed: Mar. 30, 2019

(65) Prior Publication Data

US 2019/0230632 A1 Jul. 25, 2019

Related U.S. Application Data

(63) Continuation of application No. PCT/CN2016/101203, filed on Sep. 30, 2016.

(51) Int. Cl.
*H04W 72/02* (2009.01)
*H04W 76/14* (2018.01)
(Continued)

(52) U.S. Cl.
CPC ......... *H04W 72/02* (2013.01); *H04W 56/006* (2013.01); *H04W 56/0015* (2013.01);
(Continued)

(58) Field of Classification Search
CPC . H04W 72/02; H04W 72/0446; H04W 76/14; H04W 56/0015; H04W 56/006; H04W 72/0453; H04W 72/0406
See application file for complete search history.

(56) References Cited

U.S. PATENT DOCUMENTS 10,219,247 B2 * 2/2019 Agiwal ................ H04W 72/02
10,455,587 B2 * 10/2019 Seo ........................ H04W 76/14
(Continued)

FOREIGN PATENT DOCUMENTS

| CN | 103379617 A | 10/2013 |
|----|-------------|---------|
| CN | 103974419 A | 8/2014 |

(Continued)

OTHER PUBLICATIONS

3GPP TSG RAN WG1 #79, R1-144728, Samsung:"On D2D communication related to out-of-coverage UE with TX timing not from Enb", San Francisco, USA, Nov. 17-21, 2014, total 5 pages. XP050875806.

(Continued)

*Primary Examiner* — Min Jung
(74) *Attorney, Agent, or Firm* — Kilpatrick Townsend & Stockton LLP

(57) ABSTRACT

A time-frequency resource determining method and an apparatus are provided. When a first terminal (100) uses a first time-frequency resource to communicate with a second terminal (200) by using a D2D system, and the first terminal (100) uses a second time-frequency resource to communicate with a base station by using a cellular system, because the first time-frequency resource partly or completely overlaps the second time-frequency resource, the first terminal (100) skips using the first resource to communicate with the second terminal (200). In this case, communication of the D2D system does not interfere with communication of the cellular system. Therefore, when the first time-frequency resource partly or completely overlaps the second time-frequency resource, a problem that the D2D system causes communication interference to the cellular system so that the first terminal (100) cannot communicate normally is avoided.

10 Claims, 10 Drawing Sheets

(51) Int. Cl.
  *H04W 56/00* (2009.01)
  *H04W 72/04* (2009.01)
  *H04W 72/00* (2009.01)
  *H04W 72/08* (2009.01)
  *H04W 92/18* (2009.01)

(52) U.S. Cl.
  CPC ....... *H04W 72/005* (2013.01); *H04W 72/044* (2013.01); *H04W 72/0406* (2013.01); *H04W 72/0446* (2013.01); *H04W 76/14* (2018.02); *H04W 72/082* (2013.01); *H04W 92/18* (2013.01)

(56) References Cited

U.S. PATENT DOCUMENTS

| | | | |
|---|---|---|---|
| 2015/0200756 A1* | 7/2015 | Lee | H04L 5/0048 370/329 |
| 2015/0230250 A1 | 8/2015 | Kim et al. | |
| 2016/0021676 A1 | 1/2016 | Yamazaki et al. | |
| 2016/0044740 A1* | 2/2016 | Siomina | H04W 76/14 455/552.1 |
| 2016/0057718 A1 | 2/2016 | Sorrentino et al. | |
| 2016/0135239 A1 | 5/2016 | Khoryaev et al. | |
| 2016/0156494 A1* | 6/2016 | Zhao | H04L 27/2607 370/476 |
| 2016/0270010 A1* | 9/2016 | Sorrentino | H04W 4/70 |
| 2016/0345274 A1* | 11/2016 | Zhao | H04W 52/243 |
| 2017/0027013 A1* | 1/2017 | Kim | H04W 52/30 |
| 2017/0310415 A1* | 10/2017 | Thangarasa | H04W 56/00 |
| 2017/0367059 A1* | 12/2017 | Park | H04L 5/0048 |
| 2018/0035308 A1* | 2/2018 | Nguyen | H04W 72/1273 |

FOREIGN PATENT DOCUMENTS

| | | |
|---|---|---|
| CN | 105307107 A | 2/2016 |
| CN | 105657835 A | 6/2016 |
| CN | 105900503 A | 8/2016 |
| WO | 2015113221 A1 | 8/2015 |
| WO | 2015152629 A1 | 10/2015 |
| WO | 2016074416 A1 | 5/2016 |

OTHER PUBLICATIONS

3GPP TSG RAN WG1 Meeting #85 R1-165317, Ericsson:"Distributed Synchronization Procedure for V2X over PC5", Nanjing, People''s Republic of China, May 23-27, 2016, total 6 pages. XP051089786.

"3GPP TSG-RAN WG1 #86 R1-166264, Qualcomm Incorporated:""Synchronization Procedure for V2V"", Aug. 22-26, 2016, Gothenburg, Sweden, total 3 pages. XP051125304".

3GPP TS 36.211 V14.0.0 (Sep. 2016), 3rd Generation Partnership Project;Technical Specification Group Radio Access Network;Evolved Universal Terrestrial Radio Access (E-UTRA);Physical channels and modulation(Release 14), 170 pages.

* cited by examiner

TIME-FREQUENCY RESOURCE DETERMINING METHOD AND APPARATUS

CROSS-REFERENCE TO RELATED APPLICATIONS

This application is a continuation of International Application No. PCT/CN2016/101203, filed on Sep. 30, 2016, the disclosure of which is hereby incorporated by reference in its entirety.

TECHNICAL FIELD

Embodiments of the present invention relate to the field of communications technologies, and in particular, to a time-frequency resource determining method and an apparatus.

BACKGROUND

D2D is a direct device-to-device communications technology. Compared with a conventional cellular communications technology, D2D can implement communication between terminals without forwarding by a base station. In a D2D communication process, a base station may perform resource configuration, scheduling, coordination, and the like for terminals, to assist direct communication between the terminals.

An Internet of Vehicles system is a good example of application of the D2D communications technology. In a vehicle network, vehicle-to-vehicle communication or communication between vehicles and roadside units can be used to improve security and reliability of road transportation and further improve traffic efficiency. Therefore, people are paying increasing attention to the Internet of Vehicles system in recent years. In an Internet of Vehicles system, to ensure safe driving of vehicles, information, for example, position, speed, and status information of the vehicles, needs to be exchanged periodically between the vehicles. A vehicle may broadcast the information in a single-hop manner to nearby vehicles, to improve vehicle safety in a driving process. In the Internet of Vehicles system, vehicle-to-vehicle (V2V) communication, vehicle-to-infrastructure (V2I) communication, vehicle-to-pedestrian (V2P) communication, vehicle-to-network (V2N) communication, and the like are performed.

In current Internet of Vehicles systems, a cellular network is mainly used to implement communication between vehicles or between vehicles and other terminals. V2V is used as an example. There may be two communication manners. In a first communication manner, a vehicle sends status information of the vehicle to vehicles nearby in a broadcast manner, without data forwarding by a base station, as shown in FIG. 1. In a second communication manner, information between vehicles is forwarded by a base station. A vehicle first sends status information to the base station, and the base station sends the data to other vehicles in a unicast or broadcast manner, as shown in FIG. 2. V1 to V4 in FIG. 1 and FIG. 2 represent vehicles.

An Internet of Vehicles system may run at a carrier frequency of a cellular system. In this case, the Internet of Vehicles system and the cellular system coexist at this carrier frequency. The Internet of Vehicles system runs in two scenarios: out of coverage (OOC) and in coverage (IC). In the IC scenario, the Internet of Vehicles system may use a base station (Evolved NodeB, eNodeB) or the Global Navigation Satellite System (GNSS) as a synchronization source. In the OOC scenario, the Internet of Vehicles system usually uses the GNSS as a synchronization source. Because a time difference is present between the two synchronization sources, when an IC vehicle communicates with the base station and an OCC vehicle simultaneously, the Internet of Vehicles system may cause communication interference to the cellular system, and as a result, the IC vehicle cannot communicate normally with the base station and the OCC vehicle simultaneously.

SUMMARY

Because a timing offset is present between a cellular system and a D2D system, a time-frequency resource used in communication of the cellular system overlaps a time-frequency resource used in communication of the D2D system, causing a problem of communication interference between the cellular system and the D2D system. To resolve this problem, the present invention provides a time-frequency resource determining method and an apparatus.

According to a first aspect, a time-frequency resource determining method is provided, including:
  determining, by a first terminal, a first time-frequency resource, where the first time-frequency resource is determined by the first terminal based on a first timing, and the first time-frequency resource is a time-frequency resource used for communication between the first terminal and a second terminal;
  determining, by the first terminal, a second time-frequency resource, where the second time-frequency resource is determined by the first terminal based on a second timing, and the second time-frequency resource is a time-frequency resource used for communication between the first terminal and a base station;
  determining, by the first terminal, that the first time-frequency resource partly or completely overlaps the second time-frequency resource in time domain; and
  skip using, by the first terminal, the first time-frequency resource to communicate with the second terminal.

In a process in which the first terminal uses the first time-frequency resource to communicate with the second terminal by using the D2D system, and the first terminal uses the second time-frequency resource to communicate with the base station by using the cellular system, because the first time-frequency resource partly or completely overlaps the second time-frequency resource, the first terminal skips using the first resource to communicate with the second terminal. In this way, communication of the D2D system does not interfere with communication of the cellular system. To be specific, communication of the cellular system and communication of the D2D system do not interfere with each other. Therefore, when the first time-frequency resource partly or completely overlaps the second time-frequency resource, a problem that the D2D system causes communication interference to the cellular system so that the first terminal cannot communicate normally is avoided.

In a possible design, the first timing is a timing obtained based on the Global Navigation Satellite System GNSS, and the second timing is a timing obtained based on the base station.

In a possible design, the first time-frequency resource and the second time-frequency resource each include one or more subframes.

In a possible design, the first terminal sends indication information to the second terminal, where the indication information is used to instruct not to use the first time-frequency resource for communication between the first terminal and the second terminal.

In a possible design, the first terminal sends the indication information to the second terminal by using a physical sidelink broadcast channel PSBCH.

In a possible design, the first terminal sends a timing offset to the second terminal, where
the timing offset is a timing offset between the first timing and the second timing.

According to a second aspect, a time-frequency resource determining method is provided, including:
receiving, by a second terminal, a timing offset sent by a first terminal;
determining, by the second terminal, a second timing based on the timing offset and a first timing;
determining, by the second terminal based on the first timing and the second timing, that a first time-frequency resource partly or completely overlaps a second time-frequency resource in time domain, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and a base station; and
skip using, by the second terminal, the first time-frequency resource to communicate with the first terminal.

In a possible design, the first timing is a timing obtained based on the Global Navigation Satellite System GNSS, and the second timing is a timing obtained based on the base station.

According to a third aspect, a time-frequency resource determining method is provided, including:
obtaining, by a first terminal, resource configuration information sent by a base station, where the resource configuration information is used to instruct to use a third time-frequency resource for communication between the first terminal and a second terminal; and
using, by the first terminal based on the resource configuration information, the third time-frequency resource to communicate with the second terminal.

In a possible design, the third time-frequency resource does not overlap a second time-frequency resource in time domain, where
the third time-frequency resource is determined by the base station based on a first timing, and the third time-frequency resource is a time-frequency resource used for communication between the first terminal and the second terminal; and
the second time-frequency resource is determined by the base station based on a second timing, and the second time-frequency resource is a time-frequency resource used for communication between the first terminal and the base station.

In a possible design, the first timing is a timing obtained based on the Global Navigation Satellite System GNSS, and the second timing is a timing obtained based on the base station.

In a possible design, the method further includes: sending, by the first terminal, indication information to the second terminal, where the indication information is used to instruct to use the third time-frequency resource for communication between the first terminal and the second terminal.

In a possible design, the sending, by the first terminal, the indication information to the second terminal includes:
sending, by the first terminal, the indication information to the second terminal by using a physical sidelink broadcast channel PSBCH.

In a possible design, the second time-frequency resource and the third time-frequency resource each include one or more subframes.

According to a fourth aspect, a time-frequency resource determining method is provided, including:
determining, by a base station, a third time-frequency resource, where the third time-frequency resource is determined by the base station based on a first timing, and the third time-frequency resource is a time-frequency resource used for communication between a first terminal and a second terminal;
determining, by the base station, a second time-frequency resource, where the second time-frequency resource is determined by the base station based on a second timing, and the second time-frequency resource is a time-frequency resource used for communication between the first terminal and the base station;
determining, by the base station, that the third time-frequency resource does not overlap the second time-frequency resource in time domain; and
sending, by the base station, resource configuration information to the first terminal, where the resource configuration information is used to instruct to use the third time-frequency resource for communication between the first terminal and the second terminal.

In a possible design, the first timing is a timing obtained based on the Global Navigation Satellite System GNSS, and the second timing is a timing obtained based on the base station.

In a possible design, the third time-frequency resource and the second time-frequency resource each include one or more subframes.

In a possible design, the sending the resource configuration information to the first terminal includes:
sending, by the base station, the resource configuration information to the first terminal by using a system broadcast message SIB, downlink control information DCI, or radio resource control RRC signaling.

According to a fifth aspect, a first terminal is provided, where the first terminal includes:
a processing unit, configured to determine a first time-frequency resource, where the first time-frequency resource is determined by the first terminal based on a first timing, and the first time-frequency resource is a time-frequency resource used for communication between the first terminal and a second terminal, where
the processing unit is further configured to determine a second time-frequency resource, where the second time-frequency resource is determined by the first terminal based on a second timing, and the second time-frequency resource is a time-frequency resource used for communication between the first terminal and a base station;
the processing unit is further configured to determine that the first time-frequency resource partly or completely overlaps the second time-frequency resource in time domain; and
the processing unit is further configured to skip using the first time-frequency resource for communication between the first terminal and the second terminal.

According to a sixth aspect, a second terminal is provided, where the second terminal includes:
a receiving unit, configured to receive a timing offset sent by a first terminal; and a processing unit, configured to determine a second timing based on the timing offset and a first timing, where the processing unit is further configured to determine, based on the first timing and the second timing, that a first time-frequency resource partly or completely overlaps a second time-frequency resource in time domain, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and a base station; and the processing unit is further configured to skip using the first time-frequency resource to communicate with the first terminal.

According to a seventh aspect, a first terminal is provided, where the first terminal includes:

a receiving unit, configured to obtain resource configuration information sent by a base station, where the resource configuration information is used to instruct to use a third time-frequency resource for communication between the first terminal and a second terminal; and a processing unit, configured to use, based on the resource configuration information, the third time-frequency resource to communicate with the second terminal.

According to a sixth aspect, a base station is provided, where the base station includes:

a processing unit, configured to determine a third time-frequency resource, where the third time-frequency resource is determined by the base station based on a first timing, and the third time-frequency resource is a time-frequency resource used for communication between a first terminal and a second terminal, where the processing unit is further configured to determine a second time-frequency resource, where the second time-frequency resource is determined by the base station based on a second timing, and the second time-frequency resource is a time-frequency resource used for communication between the first terminal and the base station;

the processing unit is further configured to determine that the third time-frequency resource does not overlap the second time-frequency resource in time domain; and the processing unit is further configured to generate resource configuration information; and a sending unit, configured to send the resource configuration information to the first terminal, where the resource configuration information is used to instruct to use the third time-frequency resource for communication between the first terminal and the second terminal.

According to a seventh aspect, a terminal is provided, including:

at least one communications interface;
at least one processor; and
at least one memory, where
the processor is configured to:
determine a first time-frequency resource, where the first time-frequency resource is determined by the first terminal based on a first timing, and the first time-frequency resource is a time-frequency resource used for communication between the first terminal and a second terminal;

determine a second time-frequency resource, where the second time-frequency resource is determined by the first terminal based on a second timing, and the second time-frequency resource is a time-frequency resource used for communication between the first terminal and a base station;

determine that the first time-frequency resource partly or completely overlaps the second time-frequency resource in time domain; and skip using the first time-frequency resource to communicate with the second terminal.

According to an eighth aspect, a terminal is provided, including:

at least one communications interface;
at least one processor; and
at least one memory, where
the processor is configured to:
receive a timing offset sent by a first terminal;
determine a second timing based on the timing offset and a first timing;
determine, based on the first timing and the second timing, that a first time-frequency resource partly or completely overlaps a second time-frequency resource in time domain, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and a base station; and skip using the first time-frequency resource to communicate with the first terminal.

According to a ninth aspect, a terminal is provided, including:

at least one communications interface;
at least one processor; and
at least one memory, where
the processor is configured to:
obtain resource configuration information sent by a base station, where the resource configuration information is used to instruct to use a third time-frequency resource for communication between the first terminal and a second terminal; and use, based on the resource configuration information, the third time-frequency resource to communicate with the second terminal.

According to a tenth aspect, a base station is provided, including:

at least one communications interface;
at least one processor; and
at least one memory, where
the processor is configured to:
determine a third time-frequency resource, where the third time-frequency resource is determined by the base station based on a first timing, and the third time-frequency resource is a time-frequency resource used for communication between a first terminal and a second terminal;

determine a second time-frequency resource, where the second time-frequency resource is determined by the base station based on a second timing, and the second time-frequency resource is a time-frequency resource used for communication between the first terminal and the base station;

determine that the third time-frequency resource does not overlap the second time-frequency resource in time domain; and generate resource configuration information and send the resource configuration information to the first terminal, where the resource configuration information is used to instruct to use the third time-frequency resource for communication between the first terminal and the second terminal.

It should be understood that the foregoing general description and the following detailed description are merely illustrative and explanative, and are not intended to limit the present invention.

BRIEF DESCRIPTION OF DRAWINGS

The accompanying drawings herein are incorporated in the specification as a part of the specification, showing embodiments that are in accordance with the present invention, and used together with the specification to explain a principle of the present invention.

DESCRIPTION OF EMBODIMENTS

The following describes the embodiments of the present invention with reference to the accompanying drawings.

Figure 1:
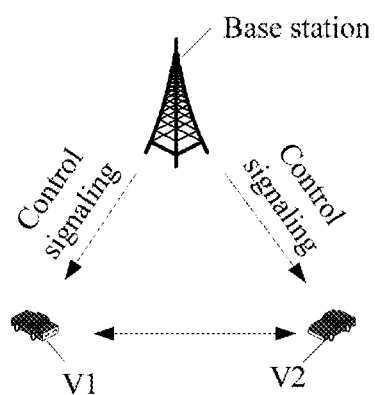
FIG. 1 is a schematic diagram of an application scenario according to an embodiment of the present invention.
Figure 2:
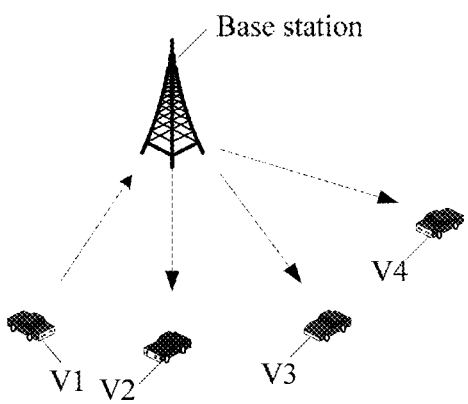
FIG. 2 is a schematic diagram of another application scenario according to an embodiment of the present invention.
Figure 3:
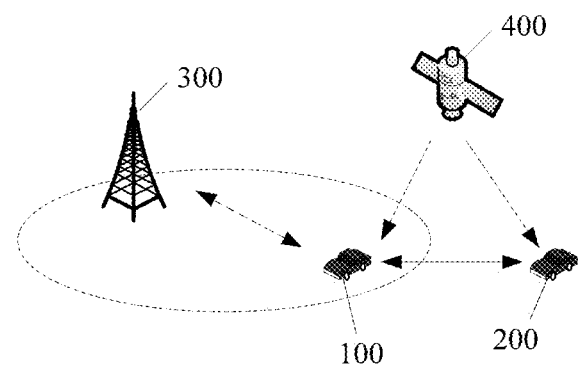
FIG. 3 is a schematic diagram of still another application scenario according to an embodiment of the present invention.
Figure 4:
FIG. 4 is a schematic structural diagram of a radio frame according to an embodiment of the present invention.

FIG. 3 is a schematic diagram of a scenario in which a terminal 100 inside a cell communicates with a terminal 200 outside the cell and a base station 300. The terminal 100 inside the cell communicates with the base station 300 by using a cellular system, and a timing of the base station, namely, an eNB timing, is used; and the terminal 100 inside the cell communicates with the terminal 200 outside the cell by using a D2D system, and a timing of a satellite 400, namely, a GNSS timing, is used. A communication resource used during communication between the terminal 100 and the terminal 200 is a specific time-frequency resource allocated by the base station for the D2D system by allocating a transmission resource pool. For example, FIG. 4 shows communication resources between the terminal 100 and the base station 300 and those between the terminal 100 and the terminal 200. D represents a downlink subframe, U represents an uplink subframe, V represents a communication subframe between the terminal 100 and the terminal 200, and S represents a special subframe in the cellular system. A subframe V in a radio frame is used for data transmission between the terminal 100 and the terminal 200.

Figure 5:
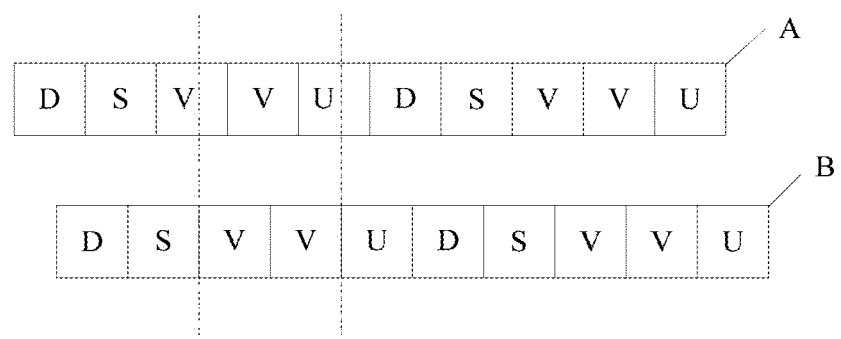
FIG. 5 is a schematic diagram of time-frequency resource overlapping according to an embodiment of the present invention.

The cellular system uses the timing of the base station, namely, the eNB timing; and the D2D system uses the timing of the satellite. A timing offset is present between the timing of the base station and the timing of the satellite. For example, when the terminal 100 obtains, by using the cellular system, a communication message sent by the base station 300, and the terminal 100 simultaneously obtains, by using the D2D system, a communication message sent by the terminal 200, communication interference between D2D communication and cellular communication may result because of the timing offset. As shown in FIG. 5, A uses the eNB timing, and B uses the GNSS timing. Because of the timing offset between the eNB timing and the GNSS timing, a second subframe V of a time-frequency resource used in D2D system communication overlaps a first subframe U of a time-frequency resource in the cellular system, so that the terminal 100 cannot properly simultaneously obtain communication data sent by the base station 300 and that sent by the terminal 200, resulting in communication interference between the cellular system and the D2D system.

Therefore, to resolve the problem of mutual communication interference between the D2D system and the cellular system because of the timing offset, an embodiment of the present invention provides a time-frequency resource determining method.

With reference to FIG. 3, in a process in which the terminal 100 communicates with the base station 300 and the terminal 200, the terminal 100 communicates with the base station 300 by using the cellular system, and the terminal 100 communicates with the terminal 200 by using the D2D system. The terminal 100 determines a first time-frequency resource based on a timing of the satellite 400, and the first time-frequency resource is used for communication between the terminal 100 and the terminal 200.

The terminal 200 determines a second time-frequency resource based on a timing of the base station 300, and the second time-frequency resource is used for communication between the terminal 200 and the base station 300.

Figure 6:
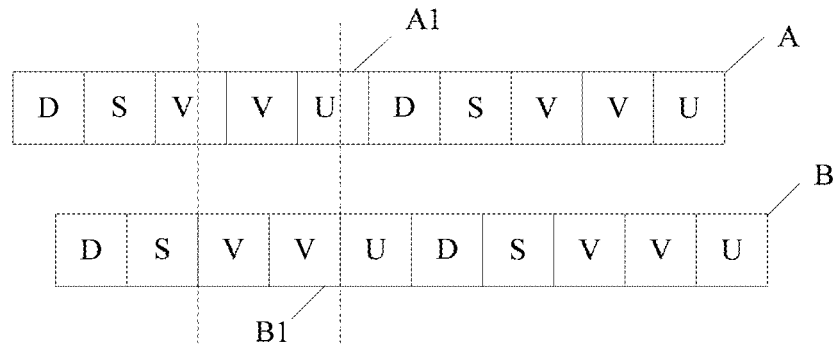
FIG. 6 is a schematic diagram of time-frequency resource overlapping according to an embodiment of the present invention.

Because a specific offset is present between the timing of the base station 300 and the timing of the satellite 400, the first time-frequency resource partly or completely overlaps the second time-frequency resource in time domain, as shown in FIG. 6. For example, in this embodiment, the first time-frequency resource may be a subframe V corresponding to B1 in FIG. 6, and the second time-frequency resource may be a subframe U corresponding to A1 in FIG. 6. In this embodiment, the first time-frequency resource partly overlaps the second time-frequency resource.

To prevent the D2D system from interfering with communication of the cellular system, that is, to prevent the terminal 100 from commutating with the terminal 200 by using the first time-frequency resource to cause partial or complete overlapping between the first time-frequency resource and the second time-frequency resource, the terminal 100 skips using the first time-frequency resource to communicate with the terminal 200.

In addition, the terminal 200 may further obtain a timing offset sent by the terminal 100, obtain a timing of the satellite 400, and calculate a timing of the base station 300 based on the timing offset and the timing of the satellite 400. The terminal 200 determines, based on the timing of the base station 300 and the timing of the satellite 400, the first time-frequency resource and the second time-frequency resource that overlap partly or completely in FIG. 6, that is, the subframes respectively corresponding to A1 and B1 in FIG. 6, and the terminal 200 skips using the first time-frequency resource to communicate with the terminal 100. That is, the terminal 200 skips using the subframe V corresponding to B1 to communicate with the terminal 100, or in other words, uses the first time-frequency resource as a reserved resource, to prevent the D2D system from interfering with communication of the cellular system to lead to a result that the terminal 100 cannot properly obtain data sent by the base station 300.

In another embodiment of the present invention, with reference to FIG. 3, when the first time-frequency resource partly or completely overlaps the second time-frequency resource, the base station 300 determines a third time-frequency resource used for communication between the terminal 100 and the terminal 200. Details are as follows:

The base station 300 determines, based on the timing of the base station 300, the second time-frequency resource used for communication between the base station 300 and the terminal 100. The base station 300 determines, based on the timing of the satellite 400, the third time-frequency resource used for communication between the terminal 100 and the terminal 200.

The second time-frequency resource does not overlap the third time-frequency resource. The base station 300 sends, to the terminal 100, resource configuration information that the third time-frequency resource is to be used for communication between the terminal 100 and the terminal 200, so that the terminal 100 communicates with the terminal 200 based on the configuration information by using the third resource. Because the third time-frequency resource does not overlap the second time-frequency resource, communication of the D2D system does not interfere with communication of the cellular system.

In addition, the base station 300 sends the resource configuration information to the terminal 100 by using a system information block (SIB), downlink control information (DCI), or radio resource control (RRC).

The terminal 100 obtains the resource configuration information sent by the base station 300, where the configuration information is used to instruct to use the third time-frequency resource for communication between the terminal 100 and the terminal 200.

The terminal 100 communicates with the terminal 200 based on the configuration information by using the third time-frequency resource.

The third time-frequency resource is determined by the base station 300 based on the timing of the base station 300. The second time-frequency resource is determined by the base station 300 based on the timing of the satellite 400, and the third time-frequency resource does not overlap the second time-frequency resource.

In addition, in another embodiment, the terminal 100 may further detect whether there is a terminal outside a serving cell (such as the terminal 200) communicating with the terminal 200. If there is no terminal outside the serving cell communicating with the terminal 200, the base station 300 may configure a terminal in the serving cell to use the base station as a synchronization source, that is, to use the timing of the base station 300, to avoid communication interference between and cellular system and the D2D system because of the timing offset.

It should be noted that a first timing in the following embodiments is equivalent to the timing of the satellite 400, namely, the GNSS timing, in the foregoing embodiment; and a second timing in the following embodiments is equivalent to the timing of the base station in the foregoing embodiment.

Figure 7:
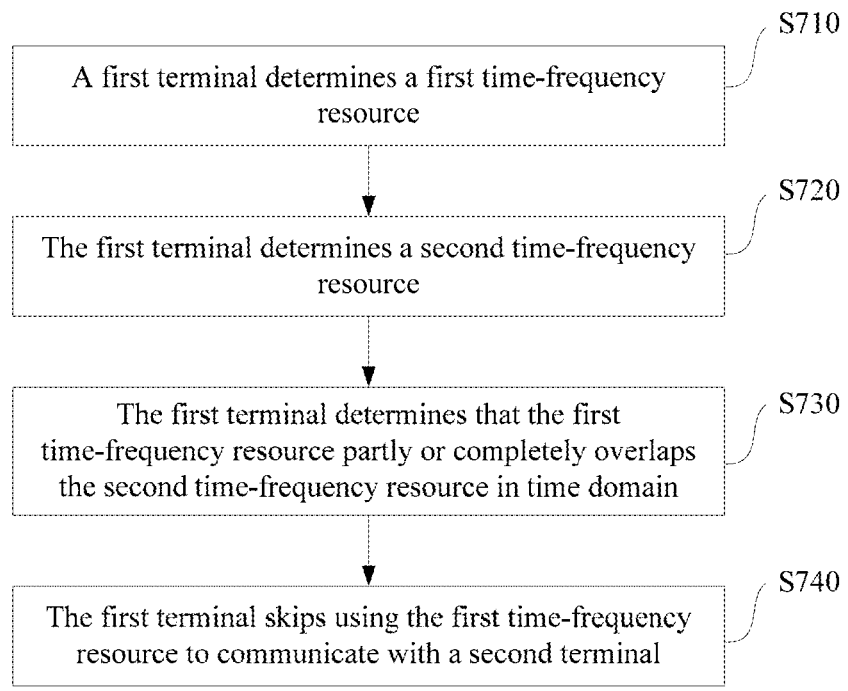
FIG. 7 is a flowchart of a time-frequency resource determining method according to an example embodiment.

To avoid communication interference between the cellular system and the D2D system because of the timing offset between the base station and the GNSS, and to describe the foregoing execution procedure in detail, in another embodiment provided in the present invention, with reference to the foregoing embodiments, a time-frequency determining method is further provided. The method is applied to a first terminal located in a serving cell, and as shown in FIG. 7, the method may include the following steps:

In step S710, the first terminal determines a first time-frequency resource.

The first time-frequency resource is determined by the first terminal based on a first timing, and the first time-frequency resource is a time-frequency resource used for communication between the first terminal and a second terminal.

In step S720, the first terminal determines a second time-frequency resource.

The second time-frequency resource is determined by the first terminal based on a second timing, and the second time-frequency resource is a time-frequency resource used for communication between the first terminal and a base station.

In step S730, the first terminal determines that the first time-frequency resource partly or completely overlaps the second time-frequency resource in time domain.

In step S740, the first terminal skips using the first time-frequency resource to communicate with the second terminal.

The first timing is a timing obtained based on the Global Navigation Satellite System GNSS, and the second timing is a timing obtained based on the base station. The first time-frequency resource and the second time-frequency resource each include one or more subframes.

With reference to the foregoing embodiments, herein, the first terminal is equivalent to the terminal 100 in FIG. 3, and the second terminal is equivalent to the terminal 200. In a process in which the first terminal uses the first time-frequency resource to communicate with the second terminal by using the D2D system, and the first terminal uses the second time-frequency resource to communicate with the base station by using the cellular system, because the first time-frequency resource partly or completely overlaps the second time-frequency resource, the terminal 100 skips using the first resource to communicate with the terminal 200. In this way, communication of the D2D system does not interfere with communication of the cellular system. To be specific, communication of the cellular system and communication of the D2D system do not interfere with each other. Therefore, when the first time-frequency resource partly or completely overlaps the second time-frequency resource, a problem that the D2D system causes communication interference to the cellular system so that the first terminal cannot communicate normally is avoided.

Figure 8:
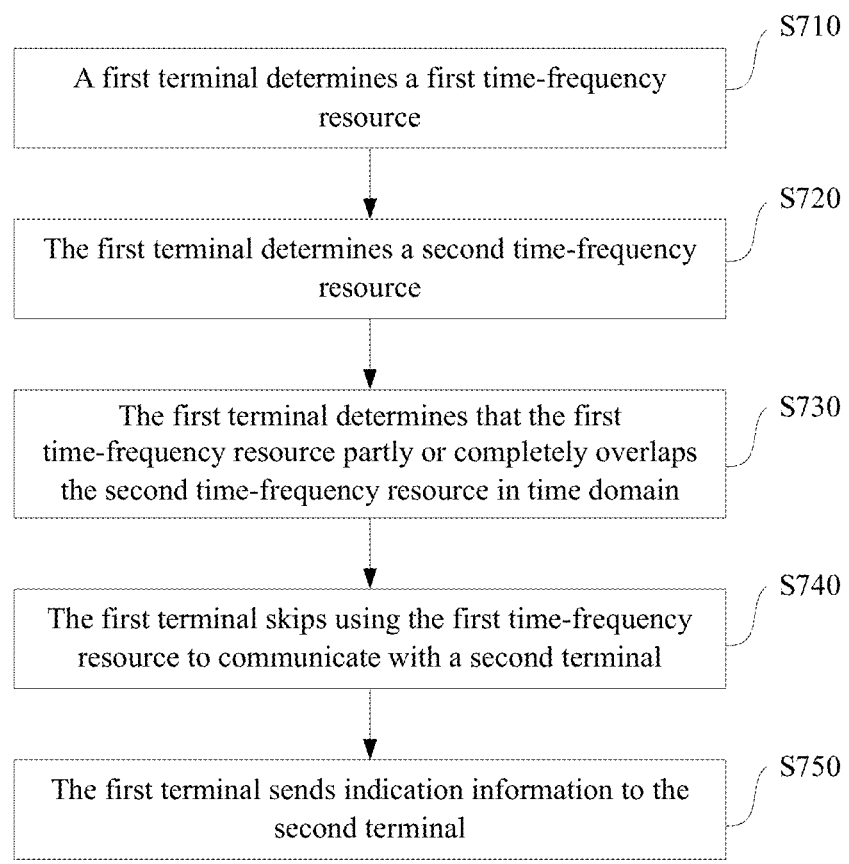
FIG. 8 is a flowchart of a time-frequency resource determining method according to another example embodiment.

In order for the second terminal not to use the first time-frequency resource to communicate with the first terminal, as a finer solution of the method in FIG. 7, in another embodiment of the present invention, as shown in FIG. 8, the method may further include the following step:

In step S750, the first terminal sends indication information to the second terminal.

The indication information is used to instruct not to use the first time-frequency resource to communicate between the first terminal and the second terminal.

The first terminal may send the indication information to the second terminal by using a physical sidelink broadcast channel (PSBCH).

The first terminal sends, to the second terminal, the indication information used to instruct not to use the first time-frequency resource for communication between the first terminal and the second terminal, thereby preventing the D2D system from interfering with normal communication of the cellular system.

Figure 9:
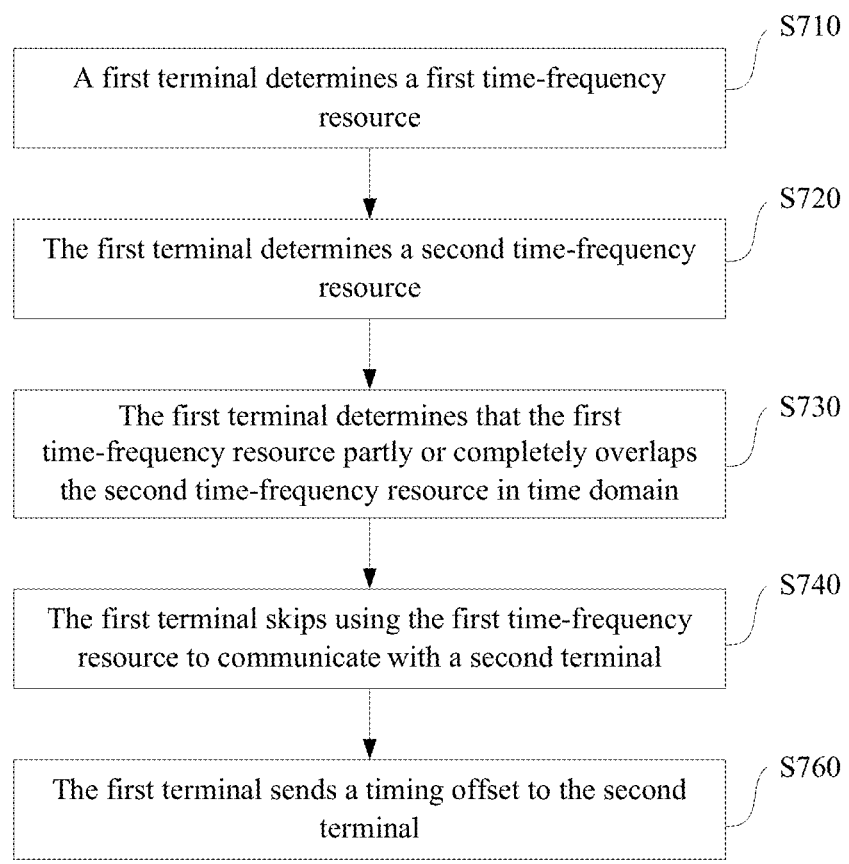
FIG. 9 is a flowchart of a time-frequency resource determining method according to another example embodiment.

In order for the second terminal not to use the first time-frequency resource to communicate with the first terminal, as a finer solution of the method in FIG. 7, in another embodiment of the present invention, as shown in FIG. 9, the method may further include the following step:

In step S760, the first terminal sends a timing offset to the second terminal.

The timing offset is a timing offset between the first timing and the second timing.

The first terminal sends the timing offset to the second terminal, so that the second terminal determines the second timing based on the timing offset and the first timing, and determines that the first time-frequency resource overlaps the second time-frequency resource based on the first timing and the second timing, and thereby avoids using the first time-frequency resource to communicate with the first terminal. This prevents communication of the D2D system from interfering with communication of the cellular system.

Figure 10:
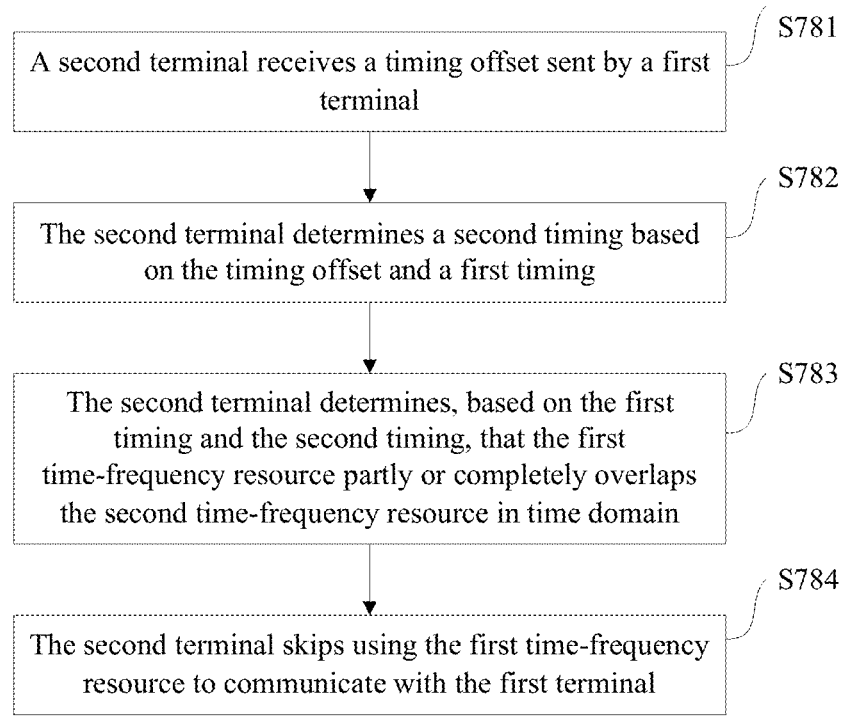
FIG. 10 is a flowchart of a time-frequency resource determining method according to another example embodiment.

In order for the second terminal not to use the first time-frequency resource to communicate with the first terminal, in another embodiment of the present invention, as shown in FIG. 10, the execution procedure on the side of the second terminal includes the following steps:

In step S781, the second terminal receives the timing offset sent by the first terminal.

In step S782, the second terminal determines the second timing based on the timing offset and the first timing, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and the base station.

In step S783, the second terminal determines, based on the first timing and the second timing, that the first time-frequency resource partly or completely overlaps the second time-frequency resource in time domain.

In step S784, the second terminal skips using the first time-frequency resource to communicate with the first terminal.

The first timing is a timing obtained based on the Global Navigation Satellite System GNSS, and the second timing is a timing obtained based on the base station. The first time-frequency resource and the second time-frequency resource each include one or more subframes.

The second terminal may further obtain a timing offset sent by the first terminal, obtain a timing of the GNSS, and calculate a timing of the base station based on the timing offset and the timing of GNSS. The second terminal determines, based on the timing of the base station and the timing of the GNSS, the first time-frequency resource and the second time-frequency resource that overlap partly or completely in FIG. 6, that is, the subframes respectively corresponding to A1 and B1 in FIG. 6, and the second terminal skips using the first time-frequency resource to communicate with the first terminal. That is, the second terminal skips using the subframe V corresponding to B1 to communicate with the first terminal, or in other words, uses the first time-frequency resource as a reserved resource, to prevent the D2D system from interfering with communication of the cellular system to lead to a result that the first terminal cannot properly obtain data sent by the base station.

Figure 11:
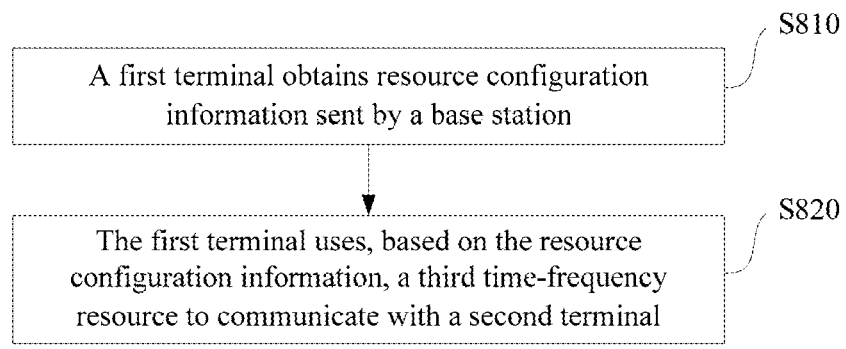
FIG. 11 is a flowchart of a time-frequency resource determining method according to another example embodiment.

In still another embodiment of the present invention, with reference to the foregoing embodiments, a time-frequency resource determining method is further provided. The method is applied to a first terminal located in a serving cell. As shown in FIG. 11, the method may include the following steps:

In step S810, the first terminal obtains resource configuration information sent by a base station.

The resource configuration information is used to instruct to use a third time-frequency resource for communication between the first terminal and the second terminal.

In step S820, the first terminal uses, based on the resource configuration information, the third time-frequency resource to communicate with a second terminal.

The third time-frequency resource does not overlap a second time-frequency resource. The third time-frequency resource is determined by the base station based on a first timing, and the third time-frequency resource is a time-frequency resource used for communication between the first terminal and the second terminal.

The second time-frequency resource is determined by the base station based on a second timing, and the second time-frequency resource is a time-frequency resource used for communication between the first terminal and the base station. The first timing is a timing obtained based on the Global Navigation Satellite System GNSS, and the second timing is a timing obtained based on the base station.

According to this embodiment, the base station configures time-frequency resources in a D2D resource pool, and sends the configuration information to the first terminal, so that the first terminal uses the third time-frequency resource to communicate with the second terminal by using a D2D system, and that the first terminal uses the second time-frequency resource to communicate with the base station, where the third time-frequency resource does not overlap the second time-frequency resource. This avoids communication interference between the D2D system and a cellular system.

Figure 12:
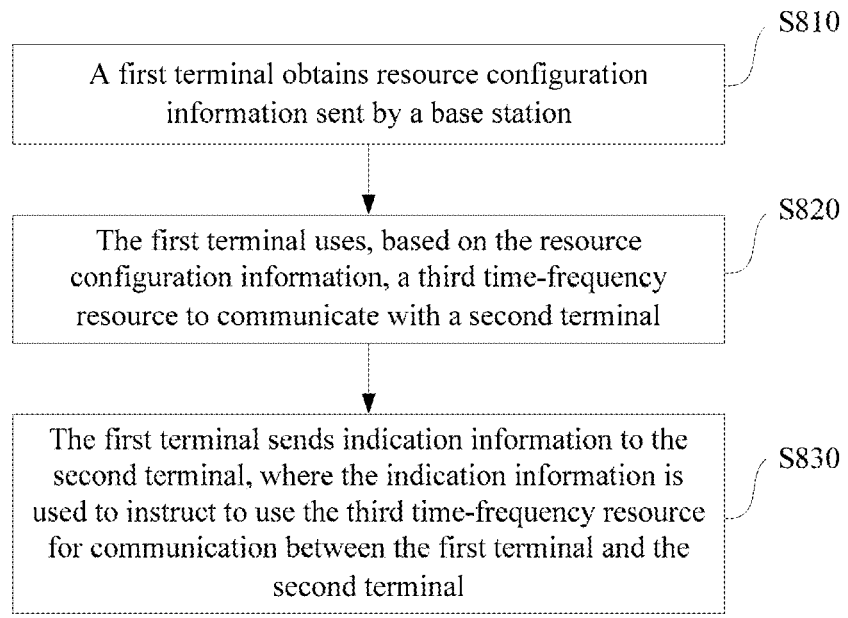
FIG. 12 is a flowchart of a time-frequency resource determining method according to another example embodiment.

In order for the second terminal to use the third time-frequency resource that does not overlap the second time-frequency resource to communicate with the first terminal, as a finer solution of the method in FIG. 11, in another embodiment of the present invention, as shown in FIG. 12, the following step may be further included:

In step S830, the first terminal sends indication information to the second terminal, where the indication information is used to instruct to use the third time-frequency resource for communication between the first terminal and the second terminal.

The first terminal sends the indication information to the second terminal by using a physical sidelink broadcast channel PSBCH.

The second time-frequency resource and the third time-frequency resource each include one or more subframes.

The first terminal sends, to the second terminal, the indication information used to instruct to use the third time-frequency resource for communication between the first terminal and the second terminal, thereby preventing the D2D system from interfering with normal communication of the cellular system.

Figure 13:
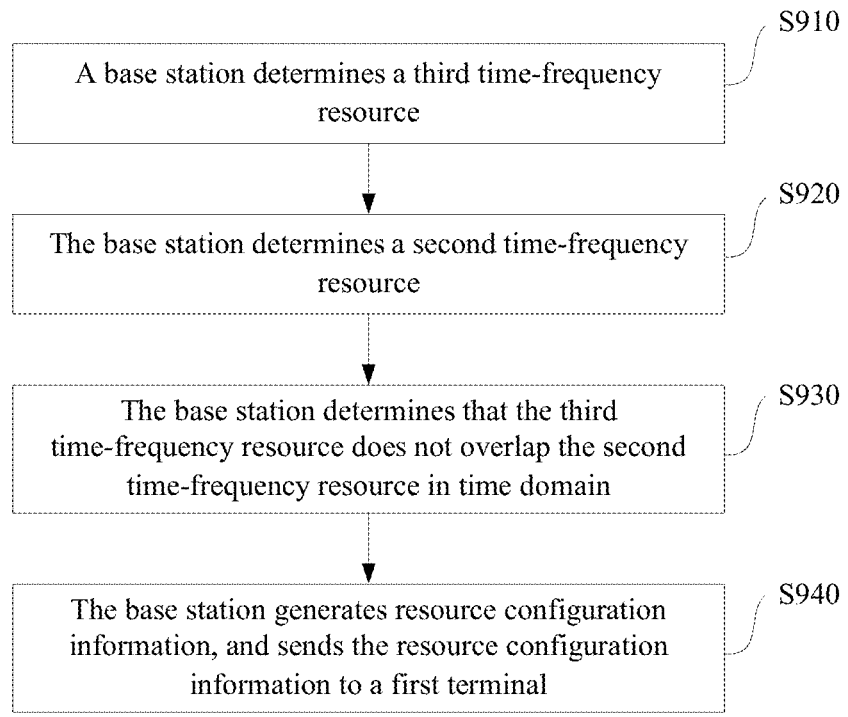
FIG. 13 is a flowchart of a time-frequency resource determining method according to another example embodiment.

In still another embodiment of the present invention, with reference to the foregoing embodiments, a time-frequency resource determining method is further provided. The method is applied to a base station. As shown in FIG. 13, the method may include the following steps:

In step S910, the base station determines a third time-frequency resource.

The third time-frequency resource is determined by the base station based on a first timing, and the third time-frequency resource is a time-frequency resource used for communication between a first terminal and a second terminal.

In step S920, the base station determines a second time-frequency resource.

The second time-frequency resource is determined by the base station based on a second timing, and the second time-frequency resource is a time-frequency resource used for communication between the first terminal and the base station.

In step S930, the base station determines that the third time-frequency resource does not overlap the second time-frequency resource in time domain.

In step S940, the base station generates resource configuration information, and sends the resource configuration information to the first terminal.

The resource configuration information is used to instruct to use the third time-frequency resource for communication between the first terminal and the second terminal.

In addition, the base station sends the resource configuration information to the terminal by using a SIB, DCI or RRC.

Because details have been described in the foregoing embodiments, reference may be made to the foregoing embodiments. Details are not described herein again.

According to the foregoing description of the method embodiments, a person skilled in the art may clearly understand that the present invention may be implemented by using software in combination with a necessary general hardware platform, and certainly may alternatively be implemented by using hardware, while the former is a more preferred implementation in most cases. Based on such an understanding, the technical solutions of the present invention essentially, or the part contributing to the prior art may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes various media that can store program code, such as a read-only memory (ROM), a random access memory (RAM), a magnetic disk, or an optical disc.

Figure 14:
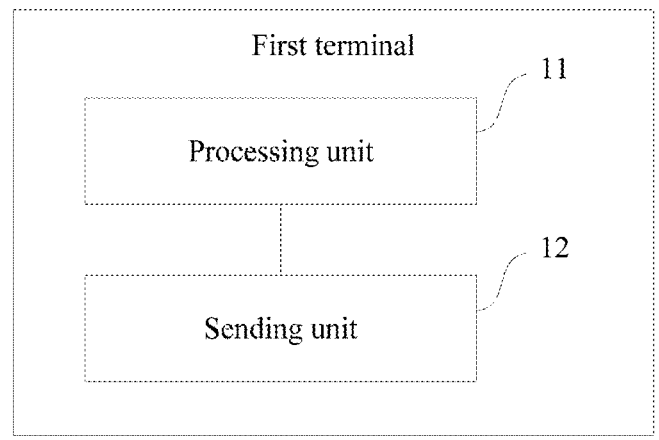
FIG. 14 is a schematic diagram of a first terminal according to an example embodiment.

In addition, for implementation of the foregoing embodiments, an embodiment of the present invention further provides a first terminal. As shown in FIG. 14, the apparatus includes:

a processing unit 11, configured to determine a first time-frequency resource, where the first time-frequency resource is determined by the first terminal based on a first timing, and the first time-frequency resource is a time-frequency resource used for communication between the first terminal and a second terminal.

The processing unit 11 is further configured to determine a second time-frequency resource, where the second time-frequency resource is determined by the first terminal based on a second timing, and the second time-frequency resource is a time-frequency resource used for communication between the first terminal and a base station.

The processing unit 11 is further configured to determine that the first time-frequency resource partly or completely overlaps the second time-frequency resource in time domain.

The processing unit 11 is further configured to skip using the first time-frequency resource to communicate with the second terminal.

The first timing is a timing obtained based on the Global Navigation Satellite System GNSS, and the second timing is a timing obtained based on the base station. The first time-frequency resource and the second time-frequency resource each include one or more subframes.

In another embodiment of the present invention, the first terminal further includes:

a sending unit 12, configured to send indication information to the second terminal, where the indication information is used to instruct not to use the first time-frequency resource for communication between the first terminal and the second terminal.

The sending unit 12 is further configured to send the indication information to the second terminal by using a physical sidelink broadcast channel PSBCH.

In another embodiment, the sending unit 12 is further configured to send a timing offset to the second terminal, where the timing offset is a timing offset between the first timing and the second timing.

Figure 18:
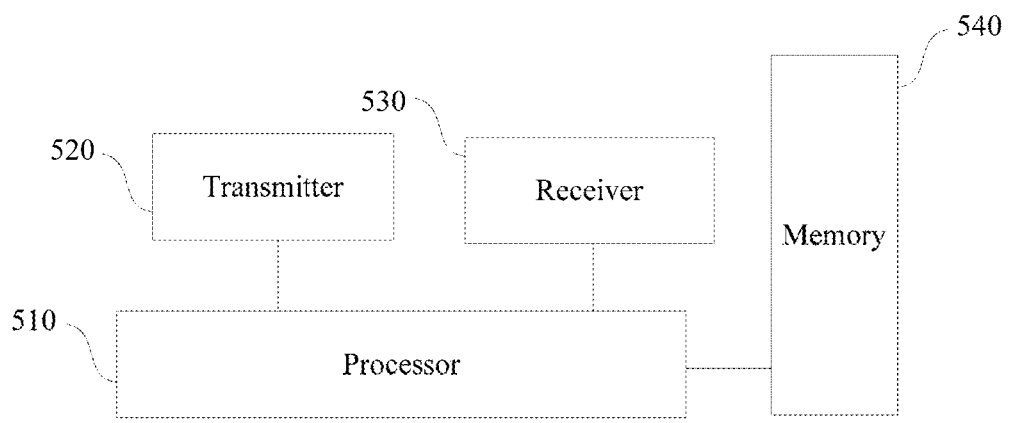
FIG. 18 is a schematic structural diagram of a time-frequency resource determining apparatus according to another example embodiment.

In an optional embodiment, the processing unit 11 may be a processor 510, and the sending unit 12 may be a transmitter 520. A receiver 530 or the transmitter 520 may be replaced by a transceiver. In addition, the first terminal may further include a memory 540, where the memory 540 is configured to store program code of and data of the first terminal. Specifically, as shown in FIG. 18, the first terminal includes the processor 510, the transmitter 520, the receiver 530, and the memory 540.

Figure 15:
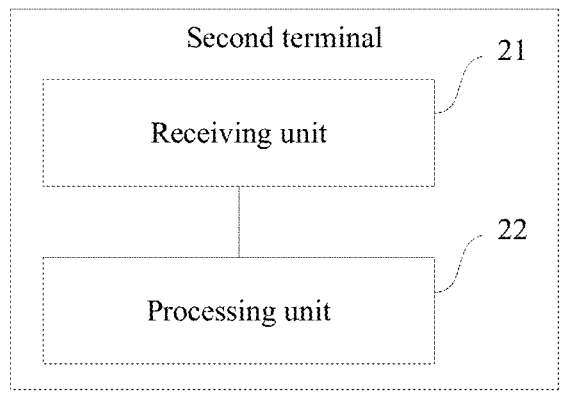
FIG. 15 is a schematic diagram of a second terminal according to another example embodiment.

In another embodiment of the present invention, a second terminal is provided. As shown in FIG. 15, the second terminal includes:

a receiving unit 21, configured to receive a timing offset sent by a first terminal; and a processing unit 22, configured to determine a second timing based on the timing offset and a first timing.

The processing unit 22 is further configured to determine, based on the first timing and the second timing, that a first time-frequency resource partly or completely overlaps a second time-frequency resource in time domain, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and a base station; and The processing unit 22 is configured to skip using the first time-frequency resource to communicate with the first terminal.

The first timing is a timing obtained based on the Global Navigation Satellite System GNSS, and the second timing is a timing obtained based on the base station. The first time-frequency resource and the second time-frequency resource each include one or more subframes.

In an optional embodiment, the processing unit 22 may be a processor 510, and the receiving unit 21 may be a receiver 530. The receiver 530 or a transmitter 520 may be replaced by a transceiver. In addition, the second terminal may further include a memory 540, where the memory 540 is configured to store program code of and data of the second terminal. Specifically, as shown in FIG. 18, the second terminal includes the processor 510, the transmitter 520, the receiver 530, and the memory 540.

Figure 16:
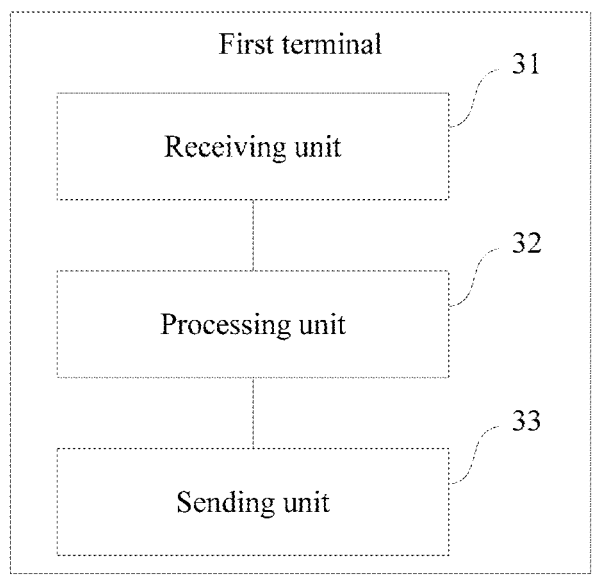
FIG. 16 is a schematic diagram of a first terminal according to another example embodiment.

An embodiment of the present invention further provides a first terminal. As shown in FIG. 16, the first terminal includes:

a receiving unit 31, configured to obtain resource configuration information sent by a base station, where the resource configuration information is used to instruct to use a third time-frequency resource for communication between the first terminal and a second terminal; and a processing unit 32, configured to use, based on the resource configuration information, the third time-frequency resource to communicate with the second terminal.

The third time-frequency resource does not overlap a second time-frequency resource, the third time-frequency resource is determined by the base station based on a first timing, and the third time-frequency resource is a time-frequency resource used for communication between the first terminal and the second terminal; and the second time-frequency resource is determined by the base station based on a second timing, and the second time-frequency resource is a time-frequency resource used for communication between the first terminal and the base station. The first timing is a timing obtained based on the Global Navigation Satellite System GNSS, and the second timing is a timing obtained based on the base station.

In another embodiment of the present invention, the first terminal further includes:

a sending unit 33, configured to send indication information to a second terminal, where the indication information is used to instruct to use a third time-frequency resource for communication between the first terminal and the second terminal.

The sending unit 33 is further configured to send the indication information to the second terminal by using a physical sidelink broadcast channel PSBCH.

The second time-frequency resource and the third time-frequency resource each include one or more subframes.

In an optional embodiment, the processing unit 32 may be a processor 510, the receiving unit 31 may be a receiver 530, and the sending unit 33 may be a transmitter 520. The receiver 530 or the transmitter 520 may be replaced by a transceiver. In addition, the first terminal may further include a memory 540, where the memory 540 is configured to store program code of and data of the first terminal. Specifically, as shown in FIG. 18, the first terminal includes the processor 510, the transmitter 520, the receiver 530, and the memory 540.

Figure 17:
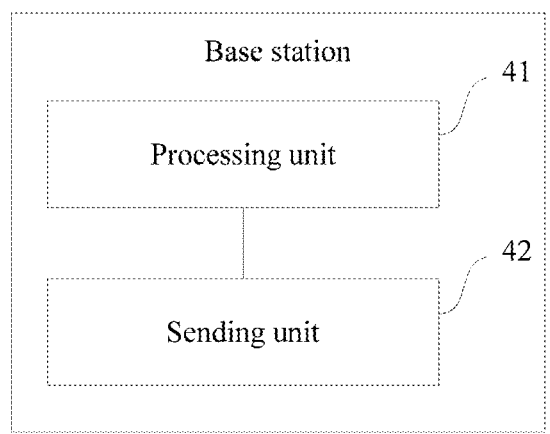
FIG. 17 is a schematic diagram of a base station according to another example embodiment.

For implementation of the foregoing embodiments, an embodiment of the present invention further provides a base station. As shown in FIG. 17, the base station includes a processing unit 41 and a sending unit 42.

The processing unit 41 is configured to determine a third time-frequency resource, where the third time-frequency resource is determined by the base station based on a first timing, and the third time-frequency resource is a time-frequency resource used for communication between a first terminal and a second terminal.

The processing unit 41 is further configured to determine a second time-frequency resource, where the second time-frequency resource is determined by the base station based on a second timing, and the second time-frequency resource is a time-frequency resource used for communication between the first terminal and the base station.

The processing unit 41 is further configured to determine that the third time-frequency resource does not overlap the second time-frequency resource in time domain.

The processing unit 41 is further configured to generate resource configuration information.

The sending unit 42 is configured to send the resource configuration information to the first terminal, where the resource configuration information is used to instruct to use the third time-frequency resource for communication between the first terminal and the second terminal.

The first timing is a timing obtained based on the Global Navigation Satellite System GNSS, the second timing is a timing obtained based on the base station, and the third time-frequency resource and the second time-frequency resource each include one or more subframes.

The sending unit 42 is further configured to send the resource configuration information to the first terminal by using a system broadcast message SIB, downlink control information DCI, or radio resource control RRC signaling.

In an optional embodiment, the processing unit 41 may be a processor 510, and the sending unit 42 may be a transmitter 520. A receiver 530 or the transmitter 520 may be replaced by a transceiver. In addition, the base station may include a memory 540, where the memory 540 is used to store program code of and data of the base station. Specifically, as shown in FIG. 18, the base station includes the processor 510, the transmitter 520, the receiver 530, and the memory 540.

Figure 19:
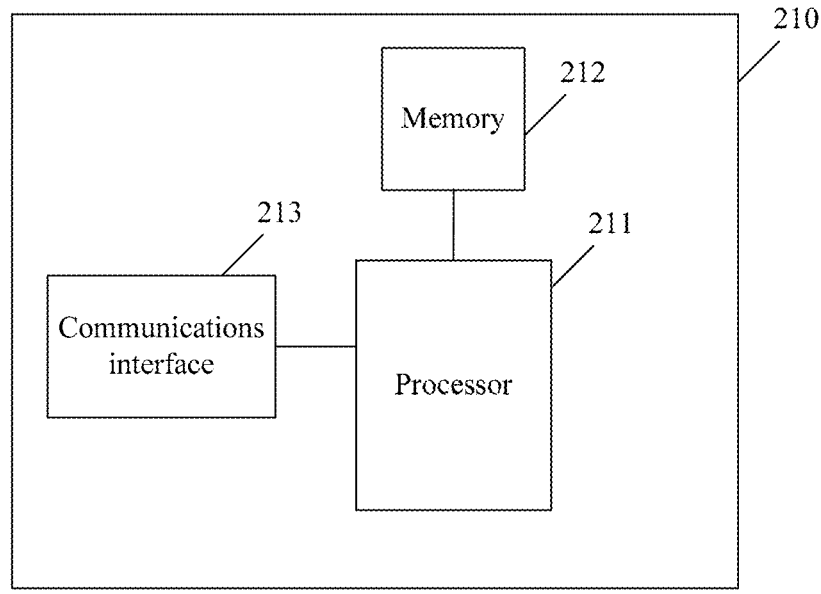
FIG. 19 is a schematic structural diagram of a time-frequency resource determining apparatus according to another example embodiment.

An embodiment of the present invention further provides an apparatus. As shown in FIG. 19, the apparatus 210 includes at least one processor 211, at least one communications interface 213, and at least one memory 212.

The memory 212 is configured to store a computer executable instruction, and the memory 212 may include a read-only memory and a random access memory, and provides the instruction and data to the processor 211. A part of the memory 211 may further include a nonvolatile random access memory (NVRAM).

The processor 211 is connected to the communications interface 213 and the memory 212.

In an embodiment of the present invention, the apparatus may be a first terminal. When the first terminal runs, the processor 211 executes the computer executable instruction stored in the memory 212, and the processor 211 may perform the steps in the embodiment shown in FIG. 7, to:

determine a first time-frequency resource, where the first time-frequency resource is determined by the first terminal based on a first timing, and the first time-frequency resource is a time-frequency resource used for communication between the first terminal and a second terminal;

determine a second time-frequency resource, where the second time-frequency resource is determined by the first terminal based on a second timing, and the second time-frequency resource is a time-frequency resource used for communication between the first terminal and a base station;

determine that the first time-frequency resource partly or completely overlaps the second time-frequency resource in time domain; and skip using the first time-frequency resource to communicate with the second terminal.

In another embodiment of the present invention, the apparatus may be a first terminal. When the terminal runs, the processor 211 executes the computer executable instruction stored in the memory 212, and the processor 211 may perform the steps in the embodiment shown in FIG. 11, to:

obtain resource configuration information sent by a base station, where the resource configuration information is used to instruct to use a third time-frequency resource for communication between the first terminal and a second terminal; and use, based on the resource configuration information, the third time-frequency resource to communicate with the second terminal.

In still another embodiment of the present invention, the apparatus may be a second terminal. When the second terminal runs, the processor 211 executes the computer executable instruction stored in the memory 212, and the processor 211 may perform the steps in the embodiment shown FIG. 10, to:

receive, a timing offset sent by a first terminal;

determine, a second timing based on the timing offset and a first timing;

determine, based on the first timing and the second timing, that a first time-frequency resource partly or completely overlaps a second time-frequency resource in time domain, where the first time-frequency resource is determined by the first terminal based on the first timing, and the first time-frequency resource is a time-frequency resource used for communication between the first terminal and the second terminal; and the second time-frequency resource is determined by the first terminal based on the second timing, and the second time-frequency resource is a time-frequency resource used for communication between the first terminal and a base station; and skip using, for the second terminal, the first time-frequency resource to communicate with the first terminal.

In still another embodiment of the present invention, the apparatus may be a base station. When the base station runs, the processor 211 executes the computer executable instruction stored in the memory 212, and the processor 211 may perform the steps in the embodiment shown in FIG. 13, to:

determine a third time-frequency resource, where the third time-frequency resource is determined by the base station based on a first timing, and the third time-frequency resource is a time-frequency resource used for communication between a first terminal and a second terminal;

determine a second time-frequency resource, where the second time-frequency resource is determined by the base station based on a second timing, and the second time-frequency resource is a time-frequency resource used for communication between the first terminal and the base station;

determine that the third time-frequency resource does not overlap the second time-frequency resource in time domain; and generate resource configuration information and send the resource configuration information to the first terminal, where the resource configuration information is used to instruct to use the third time-frequency resource for communication between the first terminal and the second terminal.

It can be understood that the present invention may be applied to various general or dedicated computing system environments or configurations, for example, a personal computer, a server computer, a handheld device or a portable device, a flat panel device, a multi-processor system, a microprocessor-based system, a set-top box, a programmable consumer electronic device, a network PC, a minicomputer, a mainframe computer, and a distributed computing environment including any one of the foregoing systems or devices.

The present invention may be described in general context of computer-executable instructions executed by a computer, for example, a program module. Generally, the program module includes a routine, a program, an object, a component, a data structure, and the like for executing a particular task or implementing a particular abstract data type. The present invention may also be practiced in distributed computing environments in which tasks are performed by remote processing devices that are connected by using a communications network. In a distributed computing environment, a program module may be located in both local and remote computer storage media including storage devices.

It should be noted that in this specification, relational terms such as "first" and "second" are only used to distinguish one entity or operation from another, and do not necessarily require or imply existence of any actual relationship or sequence between these entities or operations. Moreover, the term "include", "comprise", or any of their other variants is intended to cover a non-exclusive inclusion, so that a process, a method, an article, or a device that includes a list of elements includes not only those elements but also other elements that are not expressly listed, or further includes elements inherent to such a process, method, article, or device. An element preceded by "includes one . . . " does not, without more constraints, preclude the presence of additional identical elements in the process, method, article, or device that includes the element.

A person skilled in the art may easily figure out another implementation solution of the present invention after considering the specification and practicing the present invention that is disclosed herein. This application is intended to cover any variations, functions, or adaptive changes of the present invention. These variations, functions, or adaptive changes comply with the general principle of the present invention, and include common knowledge or a commonly used technical means in the technical field that is not disclosed in the present invention. The specification and the embodiments are merely considered as examples, and the actual scope and the spirit of the present invention are pointed out by the following claims.

It should be understood that the present invention is not limited to the accurate structures that are described in the foregoing and that are shown in the accompanying drawings, and modifications and changes may be made without departing from the scope of the present invention. The scope of the present invention is limited only by the appended claims.

What is claimed is:

1. A time-frequency resource determining method, wherein the method comprises:
   determining, by a first terminal, a first time-frequency resource, wherein the first time-frequency resource is determined by the first terminal based on a first timing, and the first time-frequency resource is a time-frequency resource used for communication between the first terminal and a second terminal;
   determining, by the first terminal, a second time-frequency resource, wherein the second time-frequency resource is determined by the first terminal based on a second timing, and the second time-frequency resource is a time-frequency resource used for communication between the first terminal and a base station;
   determining, by the first terminal, that the first time-frequency resource partly or completely overlaps the second time-frequency resource in time domain; and
   in response to determining that the first time-frequency resource partly or completely overlaps the second time-frequency resource in time domain stop using, by the first terminal, the first time-frequency resource to communicate with the second terminal and using, by the first terminal, a third time-frequency resource for communication with the second terminal, wherein the third time-frequency is determined by the base station based on second time-frequency resource.

2. The method according to claim 1, wherein the first timing is a timing obtained based on the Global Navigation Satellite System (GNSS), and the second timing is a timing obtained based on the base station.

3. The method according to claim 1, further comprising:
   sending, by the first terminal, indication information to the second terminal, wherein the indication information is used to instruct not to use the first time-frequency resource for communication between the first terminal and the second terminal.

4. The method according to claim 3, further comprising:
   sending, by the first terminal, the indication information to the second terminal by using a physical sidelink broadcast channel (PSBCH).

5. The method according to claim 1, further comprising:
   sending, by the first terminal, a timing offset to the second terminal, wherein
   the timing offset is a timing offset between the first timing and the second timing.

6. A time-frequency resource determining method, wherein the method comprises:
   receiving, by a second terminal, a timing offset sent by a first terminal;
   determining, by the second terminal, a second timing based on the timing offset and a first timing;
   determining, by the second terminal based on the first timing and the second timing, that a first time-frequency resource partly or completely overlaps a second time-frequency resource in time domain, wherein
      the first time-frequency resource is determined by the first terminal based on the first timing, and the first time-frequency resource is a time-frequency resource for communication between the first terminal and the second terminal; and
      the second time-frequency resource is determined by the first terminal based on the second timing, and the second time-frequency resource is a time-frequency resource for communication between the first terminal and a base station; and
   in response to determining that the first time-frequency resource partly or completely overlaps the second time-frequency resource in time domain stop using, by the second terminal, the first time-frequency resource to communicate with the first terminal and using, by the second terminal, a third time-frequency resource for communication with the second terminal, wherein the third time-frequency is determined by the base station based on second time-frequency resource.

7. The method according to claim 6, wherein the first timing is a timing obtained based on the Global Navigation Satellite System (GNSS), and the second timing is a timing obtained based on the base station.

8. A time-frequency resource determining method, wherein the method comprises:
   determining, by a base station, a third time-frequency resource, wherein the third time-frequency resource is determined by the base station based on a first timing, and the third time-frequency resource is a time-frequency resource used for communication between a first terminal and a second terminal;
   determining, by the base station, a second time-frequency resource, wherein the second time-frequency resource is determined by the base station based on a second timing, and the second time-frequency resource is a time-frequency resource used for communication between the first terminal and the base station;
   determining, by the base station, that the third time-frequency resource does not overlap the second time-frequency resource in time domain; and
   sending, by the base station, resource configuration information to the first terminal, wherein the resource configuration information is used to instruct to use the third time-frequency resource for communication between the first terminal and the second terminal after the first terminal determines that the second time-frequency resource is partly or completely overlaps a first time-frequency resource in time domain.

9. The method according to claim 8, wherein the first timing is a timing obtained based on the Global Navigation Satellite System (GNSS), and the second timing is a timing obtained based on the base station.

10. The method according to claim 8, wherein the sending the resource configuration information to the first terminal comprises:
    sending, by the base station, the resource configuration information to the first terminal by using a system broadcast message (SIB), downlink control information (DCI), or radio resource control (RRC) signaling.

* * * * *